United States Patent [19]
Sidik et al.

[11] Patent Number: 5,675,804
[45] Date of Patent: Oct. 7, 1997

[54] SYSTEM AND METHOD FOR ENABLING A COMPILED COMPUTER PROGRAM TO INVOKE AN INTERPRETIVE COMPUTER PROGRAM

[75] Inventors: Judianto Sidik; Paul Chun-Hong Leung; John Shek-Luen Ng; Jay William Warfield, all of San Jose, Calif.

[73] Assignee: International Business Machines Corporation, Armonk, N.Y.

[21] Appl. No.: 521,805

[22] Filed: Aug. 31, 1995

[51] Int. Cl.$^6$ .................................................. G06F 9/45
[52] U.S. Cl. ..................................... 395/705; 395/710
[58] Field of Search ................................ 395/705, 710, 395/685

[56] References Cited

U.S. PATENT DOCUMENTS

| | | | |
|---|---|---|---|
| 5,210,876 | 5/1993 | Uchida | 395/700 |
| 5,375,242 | 12/1994 | Kumar et al. | 395/700 |
| 5,469,574 | 11/1995 | Chang et al. | 395/700 |
| 5,590,331 | 12/1996 | Lewis et al. | 395/708 |

OTHER PUBLICATIONS

"A Compiler of MATLAB to MATX: Compiling and Linking of m–files to an Executable Program", Koga et al., Proc. IEEE/IFAC Joint Symp. on Computer–Aided Control System Design, 1994, pp. 137–142.

*Primary Examiner*—Kevin A. Kriess
*Assistant Examiner*—Kakali Chaki
*Attorney, Agent, or Firm*—Prentiss Wayne Johnson, Esq.; Sterne, Kessler, Goldstein & Fox P.L.L.C.

[57] ABSTRACT

A system and method for building and linking an interpretive procedure so as to enable a compiled computer program to invoke the interpretive procedure are described herein. A target object code is modified to include information identifying files associated with the interpretive procedure. A compiled representation of the interpretive procedure is generated by linking together adapter code, the modified target object code, and an interpreter. The compiled representation of the interpretive procedure is invocable by a compiled computer program. The adapter code is in binary and includes an interpreter command module. The interpreter command module when executed causes the interpreter to load and interpretively execute the files associated with the interpretive procedure. The adapter code also includes a parameter conversion module, which converts the parameter list to the interpretive computer language of the interpretive procedure.

24 Claims, 7 Drawing Sheets

SYSTEM AND METHOD FOR ENABLING A COMPILED COMPUTER PROGRAM TO INVOKE AN INTERPRETIVE COMPUTER PROGRAM

CROSS-REFERENCE TO OTHER APPLICATIONS

The following applications of common assignee contain some common disclosure, and are believed to have an effective filing date identical with that of the present application.

"PLATFORM-TRANSPARENT REGISTRATION AND BUILD OF STORED PROCEDURES AND USER-DEFINED FUNCTIONS," incorporated herein by reference in its entirety.

"PASSING STRUCTURES OR ARRAYS AS HOST VARIABLES," incorporated herein by reference in its entirety.

"SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS," incorporated herein by reference in its entirety.

"NO PREPROCESSOR AND A SOURCE LEVEL DEBUGGER FOR EMBEDDED SQL IN A 3GL," incorporated herein by reference in its entirety.

DESCRIPTION

1. Technical Field

The present invention relates generally to procedure invocation, and more particularly to the invocation of an interpretive procedure by a compiled computer program.

2. Background Art

Techniques have been developed to enable a compiled computer program, written in a first computer programming language, to invoke another compiled computer program, written in a second computer programming language. The first and second computer programming languages are "compiled computer programming languages." Computer programs written in compiled computer programming languages must first be compiled before they can be executed. Examples of compiled computer programming languages include C, FORTRAN, Ada, and COBOL.

Interpretive computer programming languages also exist. An interpreter is associated with each interpretive computer programming language (in practice, many interpreters are available on the market for each interpretive computer programming language). Computer programs written in interpretive computer programming languages need not be compiled before they are executed. Instead, the source code of such interpretive computer programs are executed line-by-line by the interpreters. BASIC is an example of an interpretive computer programming language.

It is sometimes desirable to enable a compiled computer program to invoke an interpretive computer program. However, such functionality is difficult to achieve. It is possible that this could be done by inserting an explicit reference to the interpreter and the interpretive computer program into the compiled computer program. This reference (representing one or more statements in the compiled computer program) invokes the interpreter, and commands the interpreter to execute the interpretive computer program.

This approach, however, is flawed for a number of reasons. First, the developers of the interpretive computer program may not have source files or authorization to modify the compiled computer program so that it will take steps to call the interpreter and command the interpreter to execute the interpretive computer program.

Second, it may not be convenient to provide a means for the compiled computer program to distinguish when it is calling an interpretive computer program instead of another compiled computer program; it is far more convenient for the compiled computer program to treat everything it calls alike.

Third, this approach does not allow the compiled computer program to use the native procedure calling protocol of its compiled computer programming language to invoke the interpretive computer program.

Fourth, this approach does not address the problem of data type differences between the compiled computer programming language and the interpretive computer programming language. For example, an attempt by the compiled computer program to pass a pointer to the interpretive computer program will fail if the interpretive computer programming language does not support or recognize pointers.

DISCLOSURE OF INVENTION

Briefly stated, the present invention is directed to a system and method for building and linking an interpretive procedure so as to enable a compiled computer program to invoke the interpretive procedure as through the interpretive procedure were compiled. According to the present invention, a target object code is modified to include information identifying files associated with the interpretive procedure. A compiled representation of the interpretive procedure is generated by linking together adapter code, the modified target object code, and an interpreter. The compiled representation of the interpretive procedure is invocable by a compiled computer program. The adapter code is in binary and includes an interpreter command module. The interpreter command module when executed causes the interpreter to load and interpretively execute the files associated with the interpretive procedure. The adapter code also includes a parameter conversion module, which converts the parameter list to the interpretive computer language of the interpretive procedure.

This invention enables adapter code that calls an interpretive program from a compiled program to be built simply without knowledge of the format of the object code on the target operating system. This adapter code can be ported from one system to another simply by recreating the adapter source code and modifying the commands to the linker.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF FIGURES

The present invention will be described with reference to the accompanying drawings, wherein.

BEST MODE FOR CARRYING OUT THE INVENTION

The present invention is directed to a system and method for enabling a compiled computer program, written in a compiled computer programming language, to invoke an interpretive computer program, written in an interpretive computer programming language.

The invention allows the compiled computer program to use the native procedure calling protocol of its compiled computer programming language (preferably, the database format and calling protocol) to invoke the interpretive computer program. Also, the invention addresses the problem of any data type differences between the compiled computer programming language and the interpretive computer programming language.

The invention does not require any compilation of the interpretive computer program or its pre-compiled adapter. The invention requires only that the pre-compiled adapter for the interpretive computer program be linked.

Accordingly, the invention is ideally suited for many software development applications. For example, the invention is well suited for an application where a single computer program is being distributed from a source computer platform to many diverse destination computer platforms. In such scenarios, compilers are often not available or useable at many of the destination computer platforms. Thus, it is not practical to require each destination computer platform to compile the computer program.

The invention is ideally suited for this situation since it does not require that the computer program be compiled at each destination computer platform. Instead, the invention requires only that the computer program be linked at each destination computer platform. It has been the experience of the Inventors that all computer platforms have linkers that are operable with the present invention.

Figure 1A:
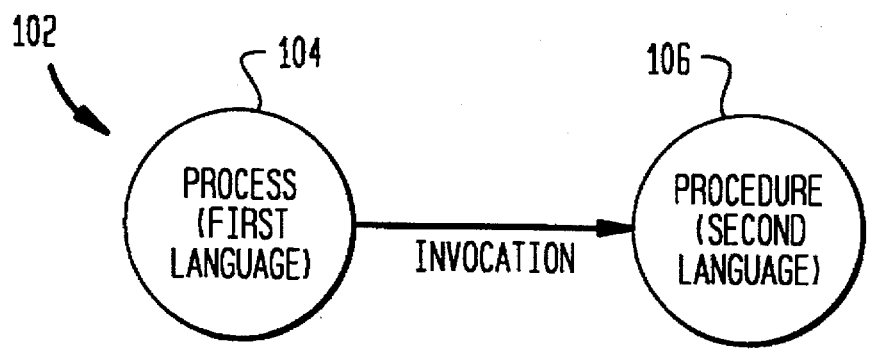
FIG. 1A illustrates a process invoking a procedure.
Figure 1B:
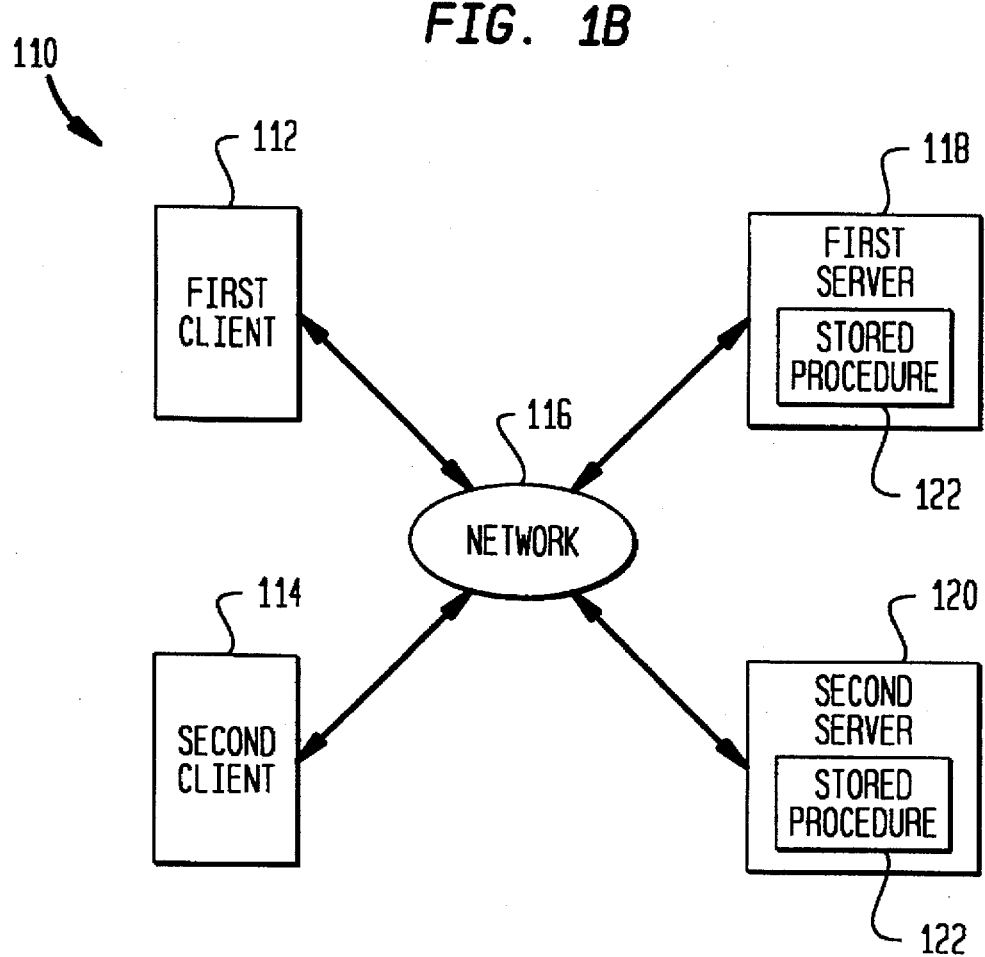
FIG. 1B illustrates a database system according to an embodiment of the invention.

The invention is well suited for use with a database system, an example of which is shown in FIG. 1B. Database system 110 includes a plurality of clients, such as first client 112 and second client 114, connected via a network 116 to a plurality of servers, such as first server 118 and second server 120. The first and second clients 112, 114 preferably represent computer programs executing in one or more computers, such as computer 202 shown in FIG. 2 (described below). The first and second servers 118, 120 preferably represent relational database management system (RDBMS) software executing in one or more computers, such as computer 202. The relational database management system represents, for example, DB2 available from International Business Machines (IBM).

Figure 7:
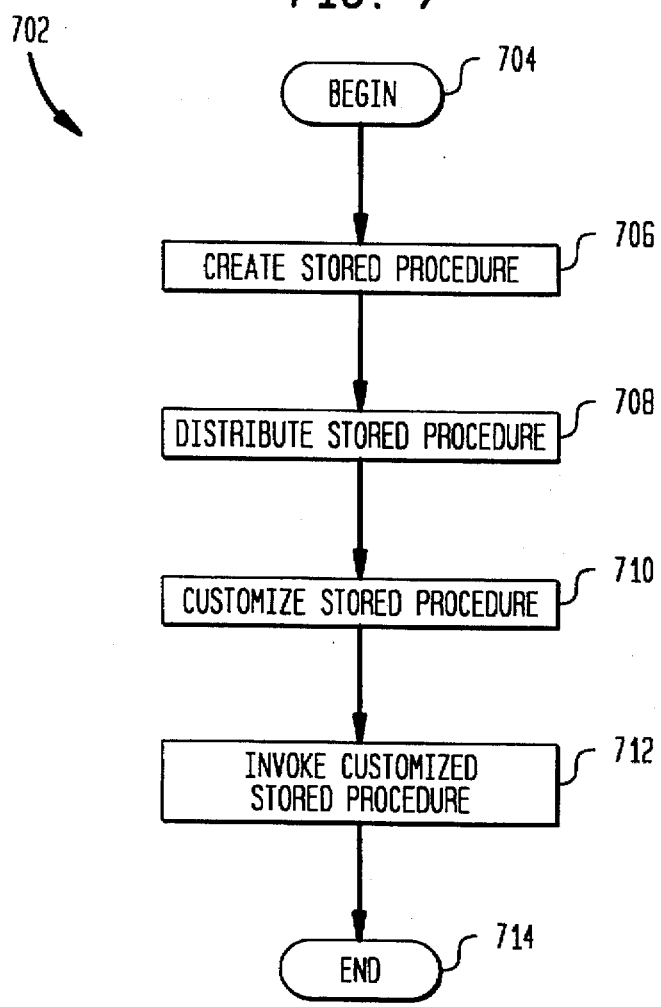

The operation of the database system 702 as regards the present invention is illustrated in a flowchart 702 shown in FIG. 7. The operation depicted in Flowchart 702 is also applicable to applications other than for database systems. Flowchart 702 begins with step 704, where control immediately passes to step 706.

In step 706, a stored procedure 122 is generated at the first client 112 (for example, an user working at the first client 112 may write the stored procedure 122). The stored procedure 122 is written in an interpretive computer programming language.

In step 708, the first client 112 distributes the stored procedure 122 to the first and second servers 118, 120 (the stored procedure 122 is then stored in the first and second servers 118, 120, as depicted in FIG. 1B). Any well known file transfer protocol may be used to distribute the stored procedure 122 to the first and second servers 118, 120. The protocol described in the following application may also be used: "PLATFORM-TRANSPARENT REGISTRATION AND BUILD OF STORED PROCEDURES AND USER-DEFINED FUNCTIONS," Attorney Docket No. ST9-95-032 (1252.2290000), incorporated herein by reference in its entirety.

In step 710, the first client 112 causes the copy of the stored procedure 122 at the first server 118 to be customized for operation on the first server 118. Also, the first client 112 causes the copy of the stored procedure 122 at the second server 120 to be customized for operation on the second server 120. After customization, it becomes possible to invoke the stored procedure 122 from compiled computer programs written using compiled computer programming languages. Such customization of the stored procedure 122 is described further below.

In step 712, the second client 114 invokes the stored procedure 112 at the first server 118 and/or the second server 120. The second client 114 represents a compiled computer program (written using a compiled computer programming language) executing in a computer. The second client 114 uses the native procedure calling protocol defined by its compiled computer programming language to invoke the stored procedure 122. Operation of flowchart 702 is complete after step 712 is performed, as indicated by step 714.

While the invention is preferably directed to enabling a compiled computer program to invoke an interpretive computer program, it should be understood that aspects of the invention are also applicable to the general case where a first computer program (written in a first computer programming language) invokes a second computer program (written in a second computer programming language). This is illustrated in FIG. 1A, where a process 104 (corresponding to the first computer program written in the first computer programming language) invokes a procedure 106 (corresponding to the second computer program written in the second computer programming language).

Figure 2:
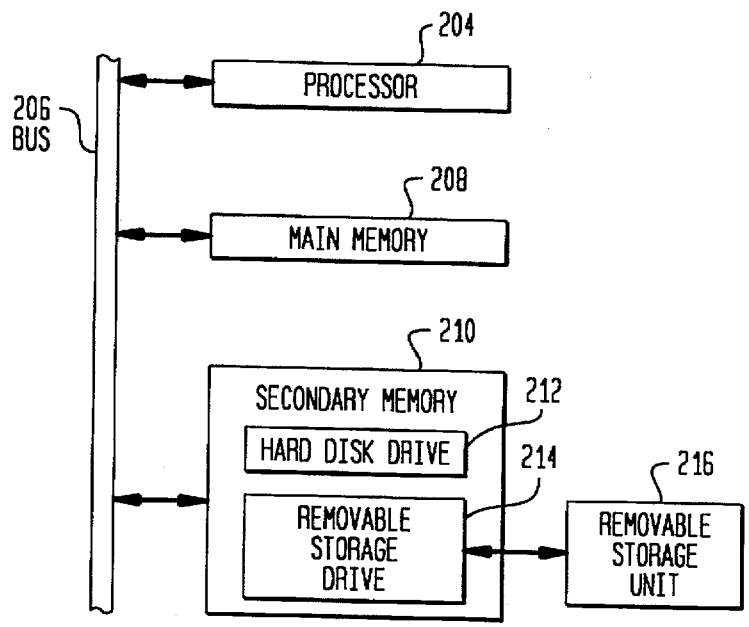
FIG. 2 is a block diagram of a computer useful for implementing elements of the invention.

FIG. 2 is a block diagram of a computer 202 used to implement elements of the invention (such as the first and second clients 112, 114, and the first and second servers 118, 120). These elements may be implemented using one or more computers 202.

The computer 202 includes one or more processors, such as processor 204. The processor 204 is connected to a communication bus 206.

The computer 202 also includes a main memory 208, preferably random access memory (RAM), and a secondary memory 210. The secondary memory 210 includes, for example, one or more hard disk drives 212 and/or one or more removable storage drives 214, each representing a floppy disk drive, a magnetic tape drive, a compact disk drive, etc. These devices may be connected directly to the bus 206 or may be connected over a network (not shown). The removable storage drives 214 each reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer 202 to perform the features of the present invention as discussed herein. In particular, the computer programs, when executed, enable the processor 204 to perform the features of the present invention. Accordingly, such computer programs represent controllers of the computer 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, one or more hardware state machines. Implementation of such hardware state machines so as to perform the functions described herein will be apparent to persons skilled in the relevant art(s).

Necessary Files at Each Target Computer Platform

As described above, in step 708 of flowchart 702 (FIG. 7), the stored procedure 122 is distributed to the servers 118, 120. At any time prior to the performance of step 710, adapter code 304 and target object code 308 are also distributed to the servers 118, 120 (preferably as an installation step typically performed at the database server or at a LAN server whose DASD is shared by multiple database servers).
from the first client 112, but alternatively from any source that contains such files).

Figure 3:
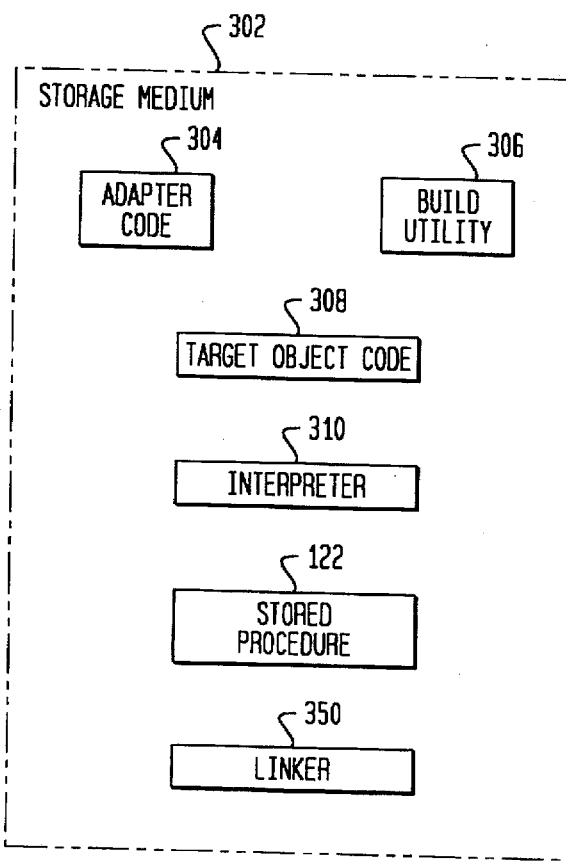
FIGS. 3 and 5 illustrate a storage medium and its contents.

The files stored at each server 118, 120 at this time (i.e., prior to the performance of step 710) are shown in FIG. 3. FIG. 3 illustrates a storage medium 302 that exists at each server 118, 120. The storage medium 302 represents a combination of the main memory 208 and the secondary memory 210 (FIG. 2). As indicated above, the storage medium 302 stores the stored procedure 122, the adapter code 304, and the target object code 308.

The stored procedure 122 represents any interpretive computer program written in an interpretive computer programming language. The stored procedure 122 is in source code form.

The adapter code 304 (also called a "stub") represents software that will eventually be "wrapped" around the stored procedure 122 so as to enable the stored procedure 122 to be called from a compiled computer program using procedure invocation calling protocol defined by the compiled computer programming language. The adapter code 304 is in object code form suitable for each target computer platform. A target computer platform is a computer running specific operating system software where the stored procedure 122 is required to execute. Accordingly, the first and second servers 118, 120 are target computer platforms. The adapter code 304 stored in the first server 118 is in object code form suitable for execution at the first server 118. Similarly, the adapter code 304 stored in the second server 120 is in object code form suitable for execution at the second server 120. Compilation of the adapter code 304 is preferably performed prior to the distribution of the adapter code 304 to the target computer platforms (i.e., servers 118, 120). The process for compiling the adapter code 304 for each target computer platform will be apparent to persons skilled in the relevant art(s).

Figure 8:
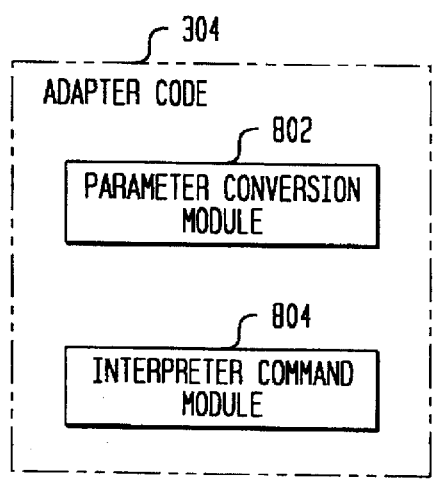
FIG. 8 is a block diagram of adapter code according to a preferred embodiment of the invention.

As shown in FIG. 8, the adapter code 304 includes a parameter conversion module 802 and an interpreter command module 804. The adapter code 304, when invoked, receives a list of parameters that are to be passed to the stored procedure 122. These parameters are in a datatype format and calling protocol defined by a first computer programming language (preferably a compiled computer programming language, such as C). The parameter conversion module 802 converts the parameters so that they are consistent with a datatype format and calling protocol defined by a second computer programming language (preferably an interpretive computer programming language, such as BASIC) that the stored procedure 122 is written in. The interpreter command module 804 commands an interpreter 310 to execute the stored procedure 122 using the converted parameters. The parameter conversion module 802 and the interpreter command module 804 are further described below.

The target object code 308 represents pre-compiled data that will eventually be used to enable the stored procedure 122 to be called from a compiled computer program using procedure invocation protocol defined by the compiled computer programming language. The target object code 308 is in binary, object code form suitable for each target computer platform. Accordingly, the target object code 308 stored in the first server 118 is in binary form suitable for use at the first server 118. Similarly, the target object code 308 stored in the second server 120 is in binary form suitable for use at the second server 120. Compilation of the target object code 308 is preferably performed prior to the distribution of the target object code 308 to the target computer platforms (i.e., servers 118, 120). The process for compiling the target object code 308 for each target computer platform will be apparent to persons skilled in the relevant art(s).

Each target computer platform (i.e., servers 118,120) also includes a build utility 306, a linker 350, and an interpreter 310. The interpreter 310 corresponds to the interpretive computer programming language that the stored procedure 122 was written in. As such, the interpreter 310 is capable of executing the stored procedure 122 without compilation. Any well known interpreter may be used. The build utility 306 is invoked to generate a computer program that, when executed, causes the interpreter 310 to execute the stored procedure 122. The linker 350 is used during this "build" process. Any well known linker may be used. The build process corresponds to the customization step 710 in flowchart 702 (FIG. 7). The build process is described below.

Build Process

Figure 4:
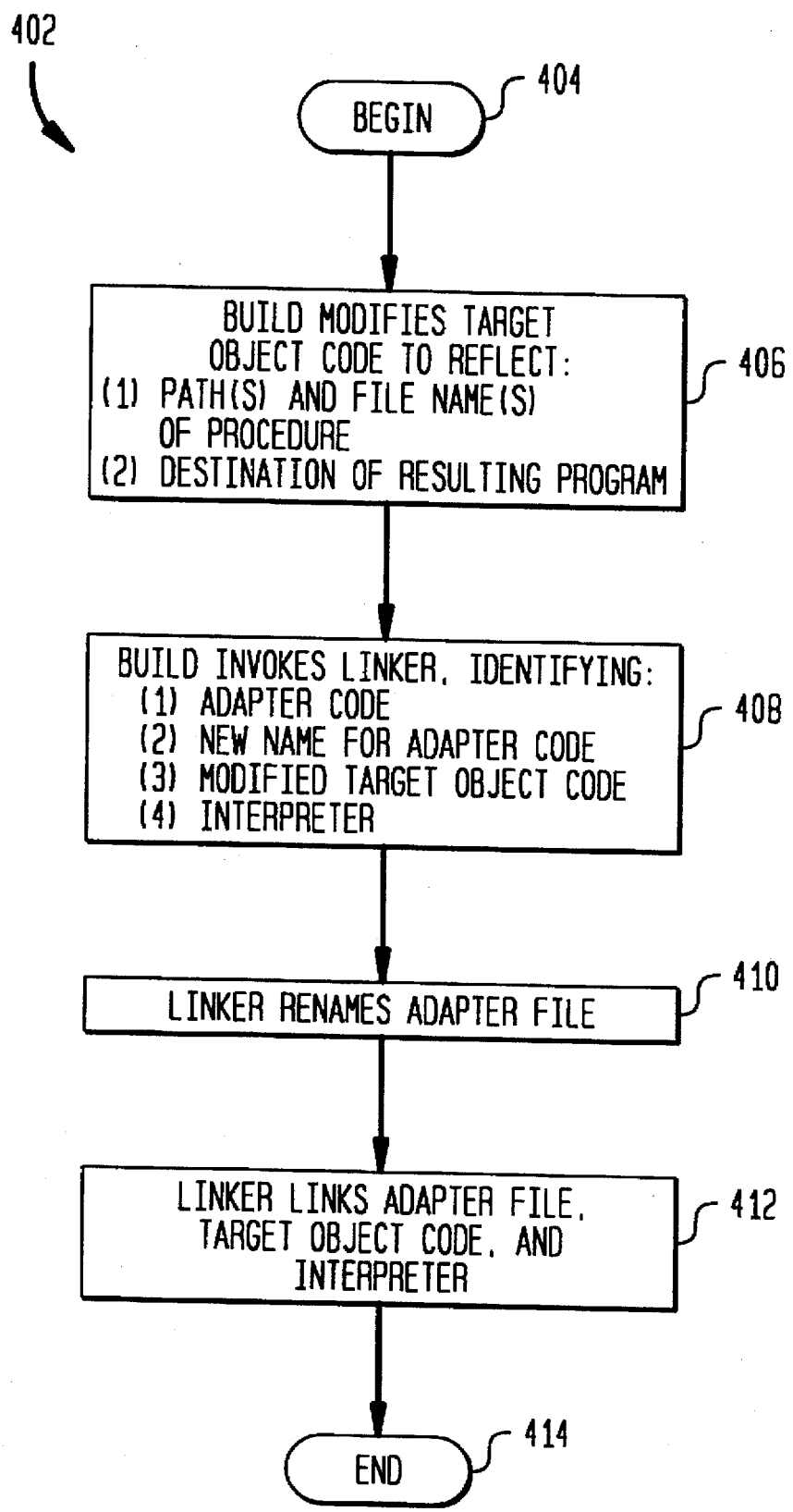
FIGS. 4, 6, 7, and 9 are flowcharts representing the preferred operation of the invention.

FIG. 4 depicts a flowchart 402 representing the operation of the build utility 306 once the build utility 306 is invoked. The build utility 306 is preferably invoked by the first client 112 (i.e., the entity responsible for distributing the stored procedure 122 to the target computer platforms). When invoking the build utility 306, the first client 112 must identify the stored procedure 122 (since there may be other stored procedures stored in the storage medium 302).

The build utility 306 must be invoked at each target computer platform. For purposes of illustration, flowchart 402 shall be described as having been invoked at the first server 118 by the first client 112. Flowchart 402 begins with step 404, where control immediately passes to step 406.

In step 406, the build utility 306 preferably makes a copy of the target object code 308 (the target object code 308 is said to be a template that is then customized for each stored procedure), and then modifies this copy of the target object code 308 to include the following information: (1) the file name(s) of the file(s) that make up the stored procedure 122, and the path(s) to these file(s) in the storage medium 302 (procedures for obtaining file names and paths given the identity of the stored procedure 122 will be apparent to persons skilled in the relevant art); and (2) the destination (i.e., the path in the storage medium 302) of the resulting computer program (the destination may have been provided by the first client 112 when the build utility 306 was invoked, or may represent free storage space chosen by the build utility 306 or some other process executing in the first server 118). The destination path is put into the target object so that the adapter can tell the interpreter during runtime where to find the (p-code for the) interpretive computer program. Furthermore, the target object code includes (3) debugger options and server information for client/server debugging, and (4) any other implementation specific that is required. The resulting computer program is the computer program that is generated as a result of performing the steps of flowchart 402.

The target object code 308 preferably consists purely of data that is customized for each stored procedure that is built; when first stored in the storage medium 302 it preferably represents an empty data string. This empty data string is in object code format (i.e., it is in binary). While performing step 406, the build utility 306 locates the file(s) corresponding to the stored procedure 122 using well known procedures, and then inserts into the copy of the target object code 308 information that identifies the file(s) and the path(s) to the file(s) (such as strings of the file names and paths). Also, the build utility 306 inserts into the copy of the target object code 308 information that identifies the destination path, the debugger options, and any other implementation dependent information that is needed.

The build utility 306 then rewrites this copy of the target object code 308 into binary format (no compilation is involved). Procedures (that do not involve compilation) for rewriting the copy of the target object code 308 into binary format will be apparent to persons skilled in the relevant art(s). (Writing a binary file is similar to writing an ASCII or text file. The well known C language provides functionality for writing a file in binary.) For reference purpose, the copy of the target object code 308 after having been rewritten into binary format is called the modified target object code 502.

This modified target object code 502 is referenced by the adapter object code, which consists of generic executable code that works for any stored procedure to be called.

In step 408, the build utility 306 invokes the linker 350. In doing so, the build utility 306 provides the following information to the linker 350: (1) information identifying a copy of the adapter code 304 (this adapter code copy 520 was previously created using well known procedures); (2) a new name for the adapter code copy 520 (this new name is preferably the same as the name of the stored procedure 122); (3) information identifying the modified target object code 502; and (4) information identifying the interpreter 310. The build utility 306 instructs the linker 350 to rename the adapter code copy 520 to the new name (i.e., to the name of the stored procedure 122). The build utility 306 also instructs the linker 350 to link together the adapter code copy 520, the modified target object code 502, and the interpreter 310. Most, if not all, conventional linkers perform these two functions. (For linkers that do not support a rename function, the invention effectively renames the adapter code by using common file system commands to copy and rename the adapter code.)

In step 410, the linker 350 renames the adapter code copy 520 to the new name. Thus, at the completion of step 410, the name of the adapter code copy 520 is the same as the name of the stored procedure 122.

In step 412, the linker 350 uses well known procedures to link together the adapter code copy 520, the modified target object code 502, and the interpreter 310. The result is a resulting computer program 504 that has the same name as the stored procedure 122, and that has linked therein the adapter code copy 520, the modified target object code 502, and the interpreter 310. The resulting computer program 504 is stored at the destination path (see step 406). Flowchart 402 is complete after step 412 has been performed, as indicated by step 414.

The resulting computer program 504 is a representation of the stored procedure 122 that has been customized to execute in the target computer platform (i.e., the first server 118 in the current example). Note that the resulting computer program 504 is a compiled computer program. However, no compilation process was necessary to generate this compiled computer program. Also note that the stored procedure 122 has not been compiled.

Figure 5:
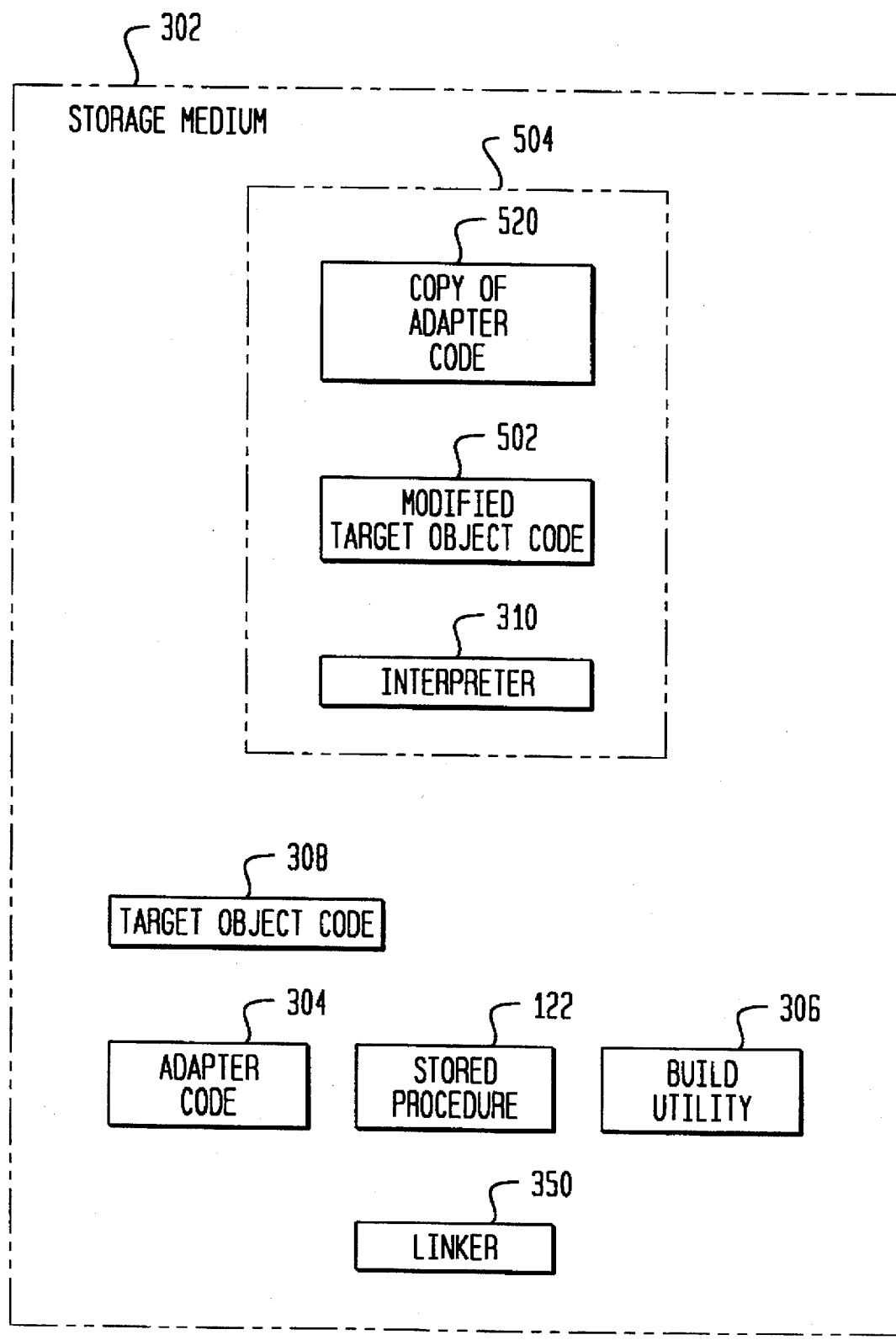

The resulting computer program 504 is shown in FIG. 5. FIG. 5 represents the storage medium 302 after step 412 has been performed. Note that the storage medium still contains the target object code 308 and the adapter code 304 in unmodified form. Thus, the target object code 308 and the adapter code 304 can be later used to customize other stored procedures (not shown).

Execution Process

Figure 6:
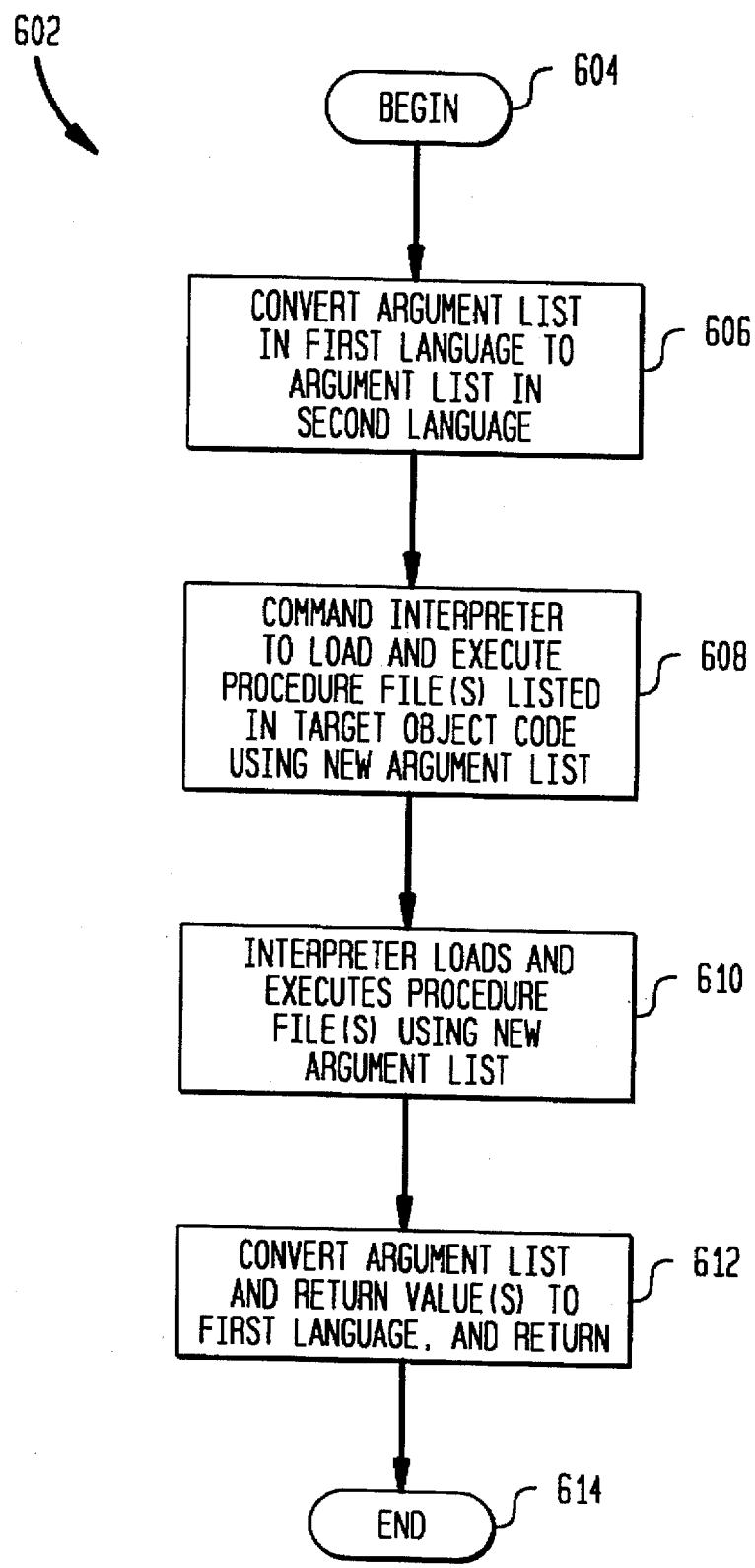

FIG. 6 is a flowchart 602 that represents the operation of the invention when an entity invokes the stored procedure 122 using the procedure invocation calling protocol and semantics of the first computer programming language. Preferably, this entity is a process representing a computer program executing in a computer, where the computer program is written in the first computer programming language. Preferably, the first computer programming language is a compiled computer programming language, and the entity corresponds to a compiled computer program executing in a computer.

For illustrative purposes, flowchart 602 is described below with respect to the second client 114 invoking the stored procedure 122 in the first server 118. The invocation command (i.e., procedure call) from the second client 114 includes an argument list that identifies parameters that are to be passed to the stored procedure 122. This argument list is consistent with the calling protocol and semantics of the first computer programming language. For reference purposes, this argument list is called the first argument list. The first server 118 receives this invocation command.

Recall that the resulting computer program 504 has the same name as the stored procedure 122. Thus, the first server 118 responds to the invocation command by executing the resulting computer program 504, since the resulting computer program 504 is a compiled computer program. The first server 118 does not attempt to execute the stored procedure 122 directly, since the stored procedure 122 is not a compiled computer program. Flowchart 602 represents the operation of the resulting computer program 504 after it has been invoked by the first server 118.

Flowchart 602 begins with step 604, where control immediately passes to step 606.

In step 606, the adapter code copy 520 in the resulting computer program 504 converts the first argument list (contained in the invocation command) to a new argument list (called the second argument list for reference purposes) that is consistent with the datatype format and calling protocol of the second computer programming language (preferably an interpretive computer programming language). This step is necessary to compensate for data type differences between the first and second computer programming languages. The parameter conversion module 802 of the adapter code copy 520 performs this step. It is noted that this step is not necessary if the data types defined by the first computer programming language are the same as those defined by the second computer programming language. Step 606 is further described below.

In step 608, the adapter code copy 520 in the resulting computer program 504 commands the interpreter 310 to load the file(s) identified by file name and path in the modified target object code 502. These files make up the stored procedure 122. The adapter code copy 520 also commands the interpreter 310 to execute the file(s) just loaded using the second argument list. The interpreter command module 804 in the adapter code copy 520 performs this step.

In step 610, the interpreter 310 loads the file(s) identified by file name and path in the modified target object code 502. Then, the interpreter 310 executes the file(s) just loaded using the second argument list in an interpretive fashion. Such operation of the interpreter 310 is well known.

After the interpreter 310 has completed execution of the stored procedure 122, the parameter conversion module 802 in the adapter code copy 520 converts the second argument list to a new argument list (called the third argument list for reference purposes) that is consistent with the datatype format and calling protocol of the first computer programming language. The parameter conversion module 802 also converts any return values to values that are consistent with the datatype format and calling protocol of the first computer programming language. The third argument list and the converted return values are returned to the calling entity (in this case, the second client 114). Flowchart 602 is complete after step 612 performed, as indicated by step 614.

Parameter Conversion

As discussed above, the parameter conversion module 802 in step 606 converts the first argument list, that is in the datatype format and calling protocol of the first computer programming language, to the second argument list, that is in the datatype format and calling protocol of the second computer programming language. Also, the parameter conversion module 802 in step 612 converts the second argument list, that is in the datatype format and calling protocol of the second computer programming language, to the third argument list, that is in the datatype format and calling protocol of the first computer programming language. The operation of the parameter conversion module 802 in this regard is described in this section.

As noted above, the invocation command includes the first argument list. The invocation command also preferably includes the data type and size of each parameter in the argument list (such data type and size being defined by the first computer programming language). This information is preferably provided by the RDBMS executing in the target computer platform.

Figure 9:
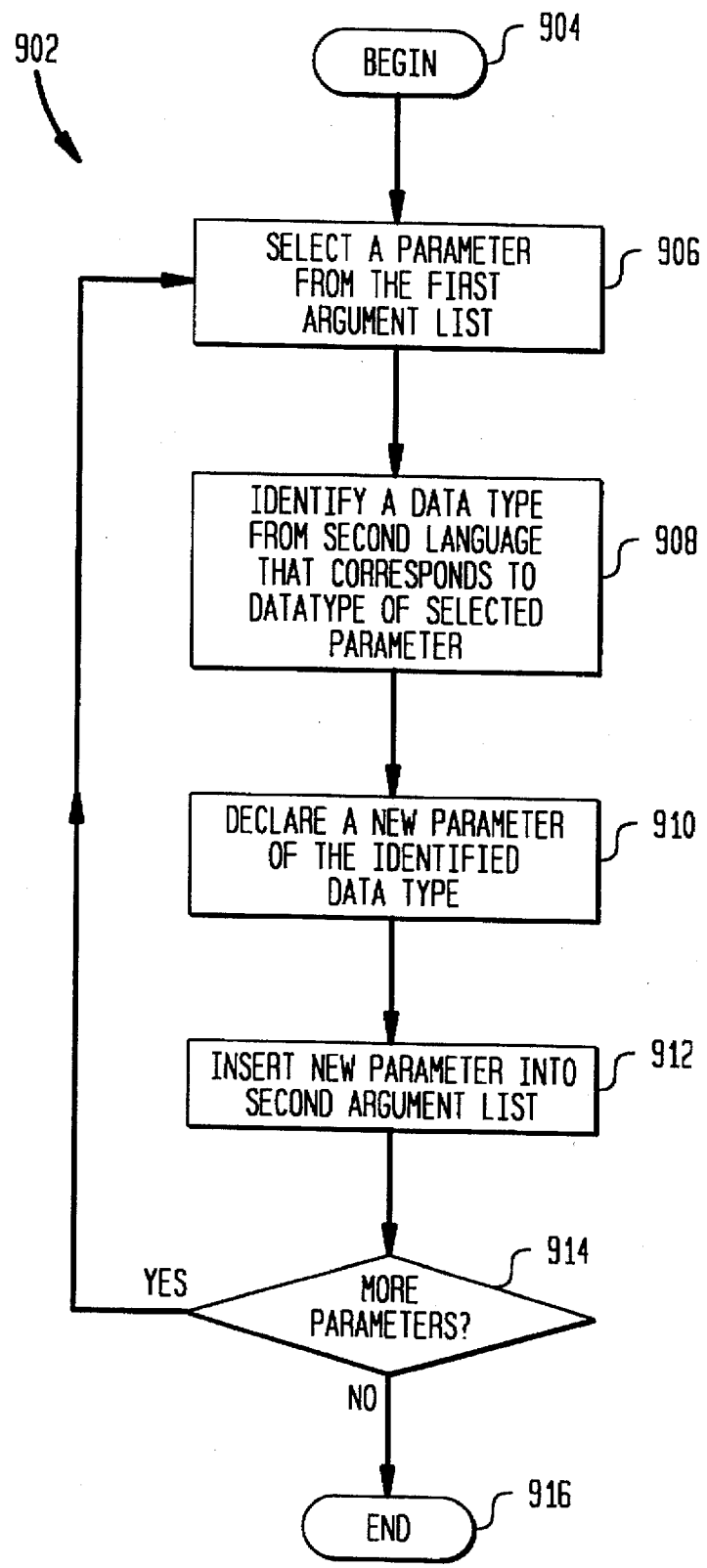

The parameter conversion module 802 uses this data type and size information to generate the second argument list, where the second argument list has one or more parameters, each parameter corresponding to one of the parameters in the first argument list. Such operation of the parameter conversion module 802 is represented by a flowchart 902 in FIG. 9. It is noted that flowchart 902 corresponds to step 606 (generating the second argument list from the first argument list), but is also applicable to step 612 (generating the third argument list from the second argument list). Flowchart 902 begins with step 904, where control immediately passes to step 906.

In step 906, the parameter conversion module 802 selects one of the parameters from the first argument list.

In step 908, the parameter conversion module 802 identifies a data type defined by the second computer programming language that is equivalent to, or that corresponds to, the data type of the selected parameter from the first argument list. Mapping of datatypes of common computer languages is well known. Mapping of SQL datatypes is covered in appropriate, publicly available SQL manuals, such as *Distributed Relational Database Architecture, IBM SQL Reference Version* 1, SC26-3255, pages 315–317, 327–328, 334–335, and 342–344, 1993, herein incorporated by reference in its entirety. Also, many publicly available manuals for computer programming languages typically document how their datatypes map to other computer languages and, if they support relational data access, how they relate to SQL datatypes.

In step 910, the parameter conversion module 802 creates a new parameter of the identified data type defined by the second computer programming language. This includes converting the value contained in the selected parameter to the identified data type, and storing the converted value into the new parameter.

In step 912, the parameter conversion module 802 inserts the new parameter into the second argument list. The new parameter has the same relative position in the second argument list as the selected parameter has in the first argument list.

In step 914, the parameter conversion module 802 determines whether there are additional parameters in the first argument list that have not yet been processed. If there are such parameters, then control returns to step 906. Otherwise, flowchart 902 is complete, as indicated by step 916.

It is noted that, in one embodiment, the invention translates structures and arrays between DB2 SQL and BASIC according to the procedures discussed in U.S. Patent Application entitled "PASSING STRUCTURES OR ARRAYS AS HOST VARIABLES," Attorney Docket No. ST9-95-027 (1252.2240000), incorporated herein by reference in its entirety.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method for building and linking an interpretive procedure so as to enable a compiled computer program to invoke the interpretive procedure, comprising the steps of:

(1) modifying a target object code to include information identifying files associated with the interpretive procedure; and (2) generating a compiled representation of the interpretive procedure by linking together adapter code, said modified target object code, and an interpreter, said compiled representation of the interpretive procedure being invocable by a compiled computer program, said adapter code being in binary and including an interpreter command module, said interpreter command module when executed causing said interpreter to load and interpretively execute said files associated with the interpretive procedure.

2. The method of claim 1, wherein step (1) comprises the steps of:

generating a copy of a target object code template, the target object code template being a binary file comprising an empty string; and for each file associated with the interpretive procedure, inserting into the copy of the target object code template a file name and path string of said each file;

wherein step (2) comprises the step of:

linking together said adapter code, said copy of the target object code template, and said interpreter to thereby produce said compiled representation of the interpretive procedure.

3. The method of claim 1, further comprising the following step that is performed between steps (1) and (2):

rewriting said target object code into binary format.

4. The method of claim 1, wherein said adapter code includes a parameter conversion module, said parameter conversion module when executed converting a first argument list in a first computer programming language and accompanying an invocation of said compiled representation to a second argument list in a second computer programming language, wherein said interpreter command module when executed causing said interpreter to load and interpretively execute said files associated with the interpretive procedure using said second argument list.

5. The method of claim 4, wherein said first computer programming language is a compiled computer programming language, and said second computer programming language is an interpretive computer programming language.

6. The method of claim 1, wherein step (2) comprises the step of:

naming said compiled representation of the interpretive procedure to a name of the interpretive procedure.

7. A system for building and linking an interpretive procedure so as to enable a compiled computer program to invoke the interpretive procedure, comprising:

target object code modifying means for modifying a target object code to include information identifying files associated with the interpretive procedure; and compiled representation generating means for generating a compiled representation of the interpretive procedure by linking together adapter code, said modified target object code, and an interpreter, said compiled representation of the interpretive procedure being invocable by a compiled computer program, said adapter code being in binary and including an interpreter command module, said interpreter command module when executed causing said interpreter to load and interpretively execute said files associated with the interpretive procedure.

8. The system of claim 7, wherein said target object code modifying means comprises:

means for generating a copy of a target object code template, the target object code template being a binary file comprising an empty string; and means for inserting into the copy of the target object code template a file name and path string for each file associated with the interpretive procedure;

wherein said compiled representation generating means comprises:

means for linking together said adapter code, said copy of the target object code template, and said interpreter to thereby produce said compiled representation of the interpretive procedure.

9. The system of claim 7, further comprising:

means for rewriting said target object code into binary format.

10. The system of claim 7, wherein said adapter code includes a parameter conversion module, said parameter conversion module when executed converting a first argument list in a first computer programming language and accompanying an invocation of said compiled representation to a second argument list in a second computer programming language, wherein said interpreter command module when executed causing said interpreter to load and interpretively execute said files associated with the interpretive procedure using said second argument list.

11. The system of claim 10, wherein said first computer programming language is a compiled computer programming language, and said second computer programming language is an interpretive computer programming language.

12. The system of claim 7, wherein said compiled representation generating means comprises:

means for naming said compiled representation of the interpretive procedure to a name of the interpretive procedure.

13. A computer system, comprising:

a processor;

a storage device having stored therein an interpretive procedure, an interpreter, a linker, adapter code in binary form, target object code in binary form, a compiled program, and a build utility;

means for invoking said build utility, said build utility when invoked causing said processor to modify the target object code to include information identifying files associated with the interpretive procedure; and means for invoking said linker, said linker when invoked causing said processor to link together said adapter code, said modified target object code, and said interpreter to thereby produce a compiled representation of the interpretive procedure; and means for invoking said compiled program, said compiled program when invoked causing said processor to invoke said compiled representation of the interpretive procedure, said compiled representation of the interpretive procedure when invoked causing said processor to invoke an interpreter command module contained in the adapter code, said interpreter command module when invoked causing said interpreter to load and interpretively execute said files associated with the interpretive procedure.

14. The computer system of claim 13, wherein said build utility comprises:

means for causing said processor to generate a copy of a target object code template, the target object code template being a binary file comprising an empty string; and means for causing said processor to insert into the copy of the target object code template a file name and path string for each file associated with the interpretive procedure;

wherein said linker comprises:

means for causing said processor to link together said adapter code, said copy of the target object code template, and said interpreter to thereby produce said compiled representation of the interpretive procedure.

15. The computer system of claim 13, wherein said build utility comprises:

means for causing said processor to rewrite said target object code into binary format.

16. The computer system of claim 13, wherein said adapter code includes a parameter conversion module, said parameter conversion module when executed causing said processor to convert a first argument list in a first computer programming language and accompanying an invocation of said compiled representation to a second argument list in a second computer programming language, wherein said interpreter command module when executed causing said interpreter to load and interpretively execute said files associated with the interpretive procedure using said second argument list.

17. The computer system of claim 16, wherein said first computer programming language is a compiled computer programming language, and said second computer programming language is an interpretive computer programming language.

18. The computer system of claim 13, wherein said linker comprises:

means for causing said processor to name said compiled representation of the interpretive procedure to a name of the interpretive procedure.

19. A program storage device readable by a machine, tangibly embodying a program of instructions executable by the machine to perform method steps for building and linking an interpretive procedure so as to enable a compiled computer program to invoke the interpretive procedure, said method steps comprising:

(1) modifying a target object code to include information identifying files associated with the interpretive procedure; and (2) generating a compiled representation of the interpretive procedure by linking together adapter code, said modified target object code, and an interpreter, said compiled representation of the interpretive procedure being invocable by a compiled computer program, said adapter code being in binary and including an interpreter command module, said interpreter command module when executed causing said interpreter to load and interpretively execute said files associated with the interpretive procedure.

20. The program storage device of claim 19, wherein step (1) comprises the steps of:

generating a copy of a target object code template, the target object code template being a binary file comprising an empty string; and for each file associated with the interpretive procedure, inserting into the copy of the target object code template a file name and path string of said each file;

wherein step (2) comprises the step of:

linking together said adapter code, said copy of the target object code template, and said interpreter to thereby produce said compiled representation of the interpretive procedure.

21. The program storage device of claim 19, said method steps further comprising the following step that is performed between steps (1) and (2):

rewriting said target object code into binary format.

22. The program storage device of claim 19, wherein said adapter code includes a parameter conversion module, said parameter conversion module causing the machine to convert a first argument list in a first computer programming language and accompanying an invocation of said compiled representation to a second argument list in a second computer programming language, wherein said interpreter command module enabling the machine to cause said interpreter to load and interpretively execute said files associated with the interpretive procedure using said second argument list.

23. The program storage device of claim 22, wherein said first computer programming language is a compiled computer programming language, and said second computer programming language is an interpretive computer programming language.

24. The program storage device of claim 19, wherein step (2) comprises the step of:

naming said compiled representation of the interpretive procedure to a name of the interpretive procedure.

* * * * *